INVENTORS
William R. Harding and
Scott H. Hanville, Jr.
BY
Paul E. Friedemann
ATTORNEY

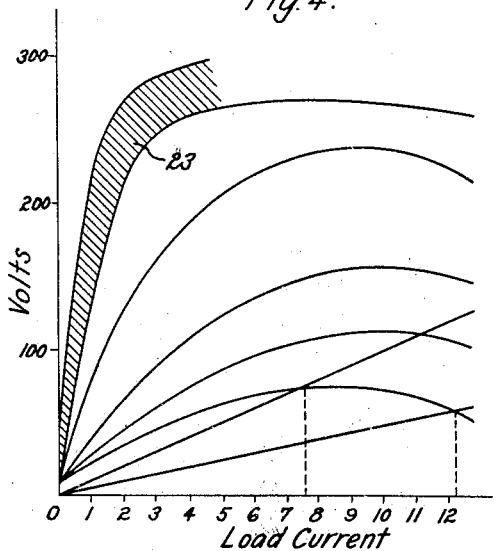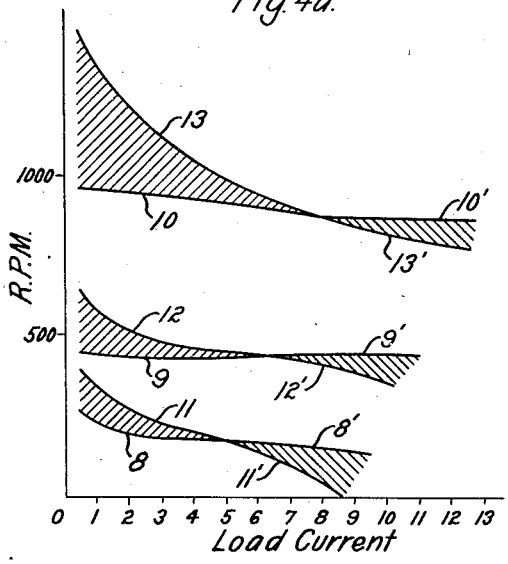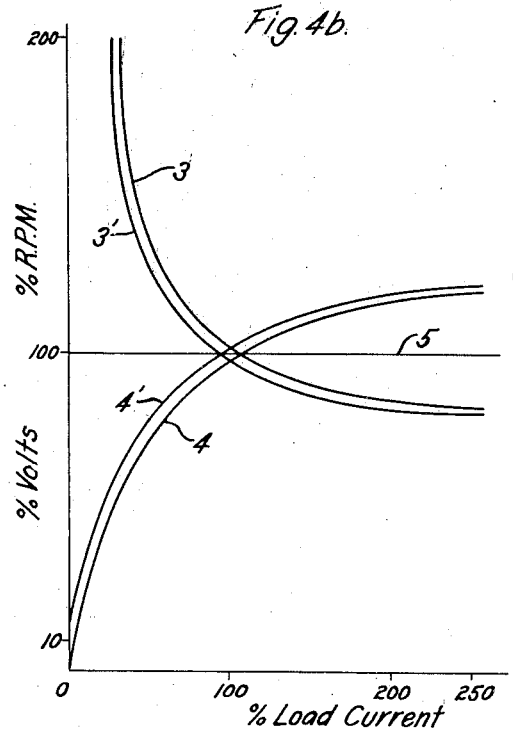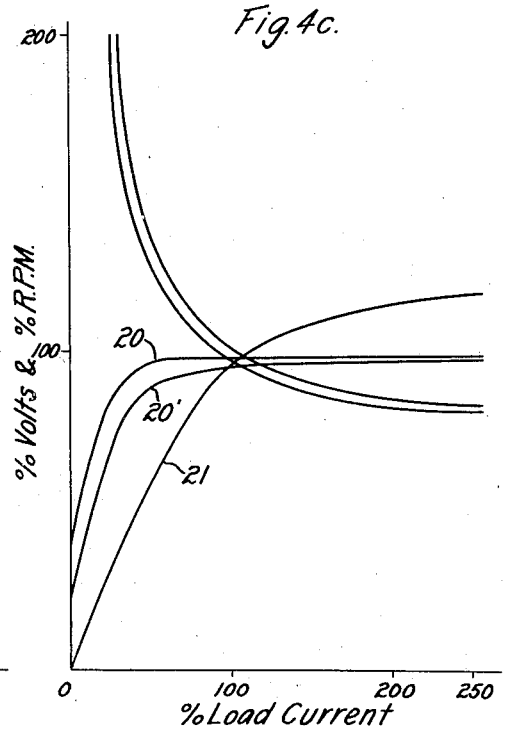

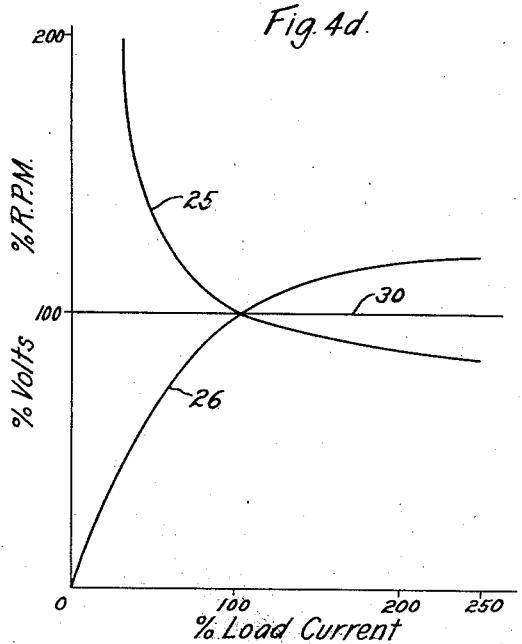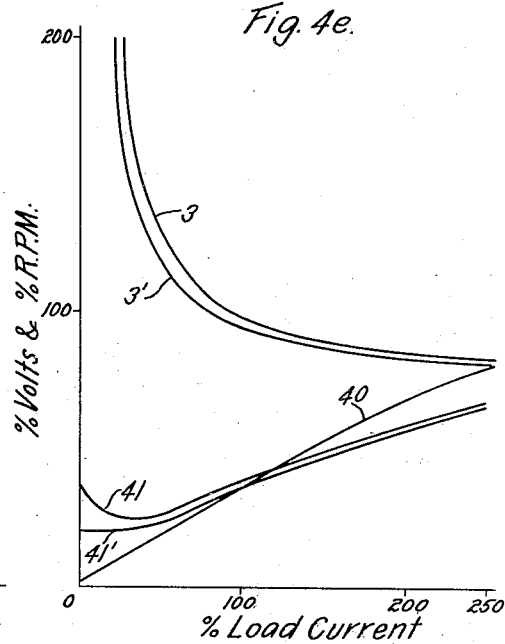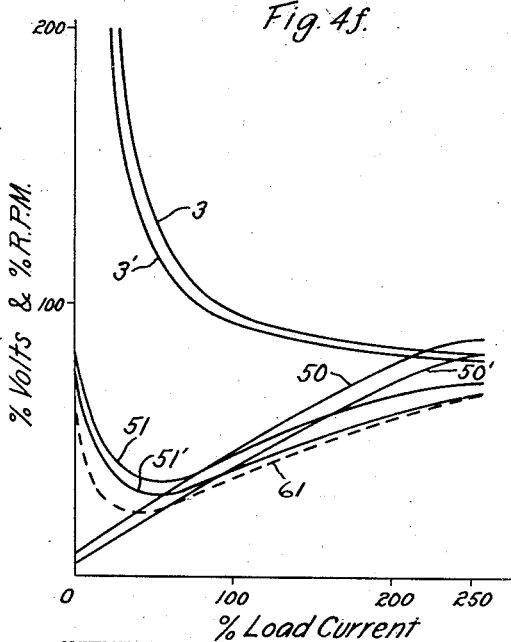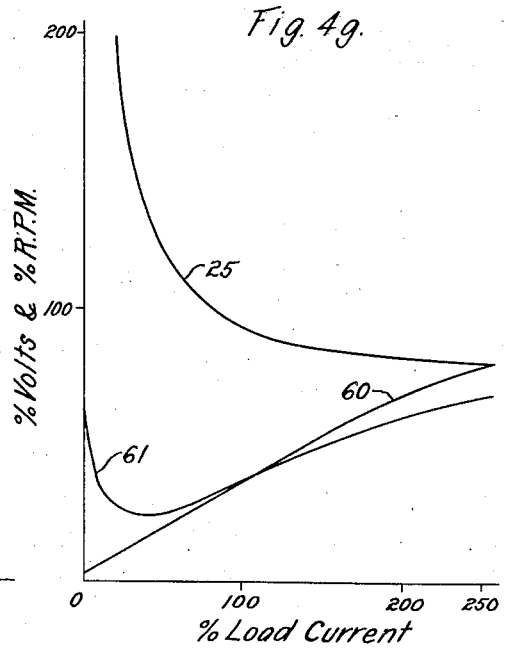

Patented June 26, 1945

2,379,149

UNITED STATES PATENT OFFICE 2,379,149

SERIES VARIABLE SPEED DRIVE

William R. Harding, Murrysville, Pa., and Scott H. Hanville, Jr., Huron, Ohio, assignors to Westinghouse Electric Corporation, East Pittsburgh, Pa., a corporation of Pennsylvania Application November 11, 1941, Serial No. 418,628

11 Claims. (Cl. 172—239)

Our invention relates to adjustable speed drives, and more particularly to a variable voltage generator and motor drive in which the generator is a series generator without a separately or shunt excited field winding, and the motor is also of the series type having the same or substantially the same frame size as the generator and thus having a rating substantially equal to that of the generator.

Our present invention includes improvements over our invention disclosed and claimed in our pending application entitled "Series speed control units," filed on October 19, 1940, Serial No. 361,934.

Series motors, of course, are in regular use and well known to the trade but series generators for operating motors have always been held very unsatisfactory. For instance, as one of their disadvantages, such generators have a rising voltage characteristic with an increase in load current. This is usually very unsatisfactory. However, by selecting the proper values of the constants of both the generator and the motor, the motor speed may be kept substantially constant for any speed setting selected regardless of the variations in load.

One broad object of our invention is to provide for substantially constant speed of a series motor energized from a series generator for all speeds selected for the motor regardless of variations in load on the motor.

Another object of our invention is to provide for stable high torque operation of a series motor, operated from a series generator at low motor speed.

Another object of our invention, as hereinafter disclosed, is to provide for good speed regulation at light loads.

It is also an object to provide in a variable voltage drive a series generator having negligible residual flux with reference to the no-load saturation flux of the generator.

It is also an object of our invention to provide, in a variable voltage drive utilizing a series generator and a series motor, a low residual flux in the generator and a low residual flux in the motor, but the residual fluxes of the two machines having such relation that the low residual flux of the generator is higher than the low residual flux of the motor.

One object of our invention is to provide, in a variable voltage drive utilizing a series generator and a series motor, a motor having a lower residual flux than the generator and for controlling the speed of such a motor in a series drive from a remote point.

A still further object of our invention is the provision of a substantially constant speed for a series motor energized from a series generator for all speeds selected for the motor regardless of the variations in load on the motor coupled with the provision of increasing the torque of the motor, particularly at the low speeds and the provision of low residual flux in the generator and still lower residual flux in the motor.

Another broad object of our invention is to provide for stable high torque operation of a series motor operated from a series generator at low speeds and to provide for good speed regulation of the motor at low loads and low speeds.

It is a still further object of our invention as hereinafter disclosed to provide for good speed regulation at low speeds from low loads to high loads.

It is also an object of our invention to provide, in a variable voltage drive having a series generator and a series motor, a residual flux in the motor less than the residual flux of the generator and means to obtain high torques at low speeds up to the stalled rotor condition of the motor and good speed regulation at low speeds and low loads.

Another object of our invention is to provide simple and effective means for decreasing the effect of armature reaction tending to displace the current sheet in combination with the provision of good speed regulation at low speeds and light loads by utilizing a low residual flux in the series generator and a still lower residual flux in the motor.

The objects hereinbefore expressed are believed to be merely illustrative and many other objects and advantages will become more apparent from a study of the following specification when considered with the drawings accompanying this specification, and in which drawings:

Figs. 4, 4a, 4b, 4c, 4d, 4e, 4f and 4g show a plurality of curves helpful in illustrating some of the characteristics of our series drive.

Figure 1:
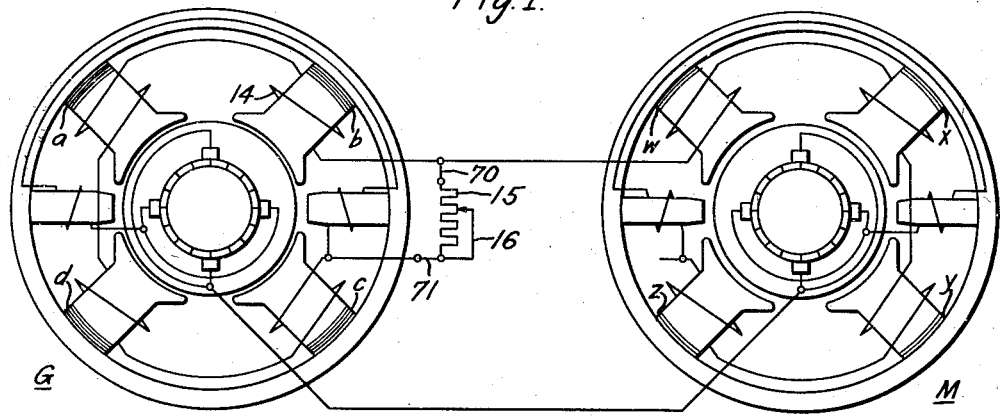
Figure 1 is a diagrammatic showing of our invention showing the more comprehensive combination.

In Fig. 1, G designates a series generator and M a series motor. The two dynamo-electric machines G and M are preferably, though not necessarily, of the same frame size, and thus have comparable ratings and are otherwise preferably generally alike in structure. It will be noted that the generator, however, is a four-pole machine having interpoles, or commutating poles of high magnetic capacity, whereas the motor is a four-pole machine having interpoles of somewhat lower magnetic capacity.

Figure 3:
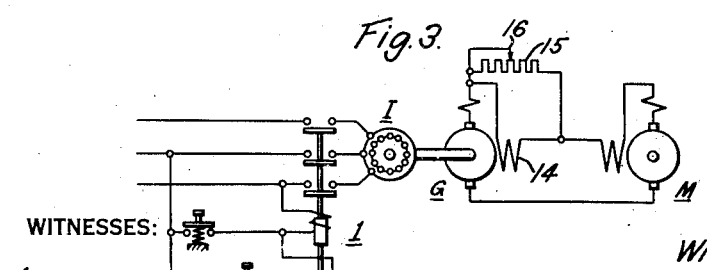
Fig. 3 shows our drive in its simplest diagrammatic form.

As will be seen from Fig. 3, the generator is driven by a suitable constant speed alternating-current motor I representing an induction motor connected through a suitable line switch I, controlled by means of a push button control, to a suitable source of alternating current. The generator G, of course, may be driven at some constant speed in any suitable manner, and it is not one of the features of our invention that a constant speed induction motor need be used.

Figure 2:
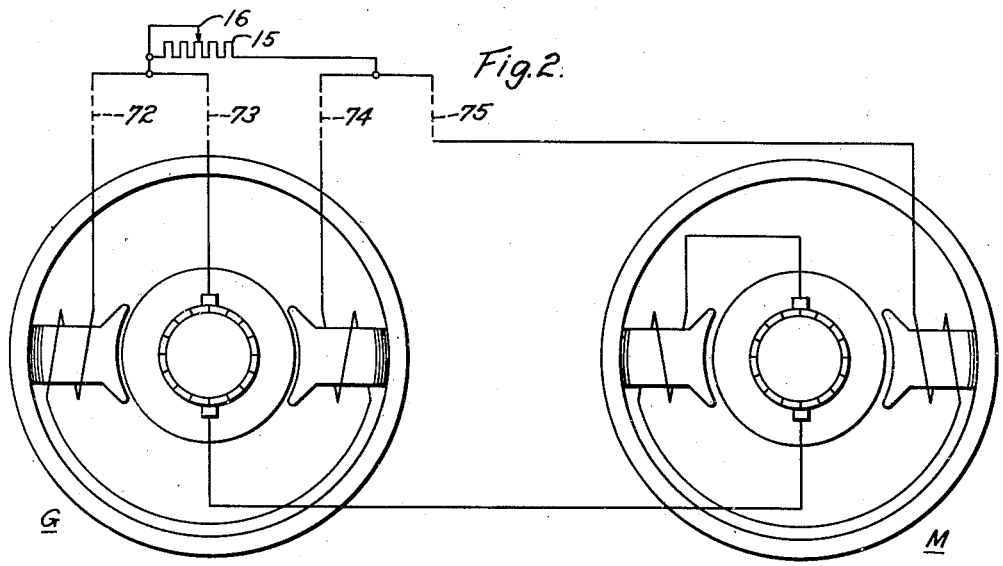
Fig. 2 is a diagrammatic showing of a modification of our invention.

In the showing in Fig. 1, we have shown the motor and the generator of the four-pole type, but it will become apparent, as Fig. 2 is discussed, that our invention is not limited to a four-pole construction but may be applicable to machines of the two-pole type or of the type having more than four poles.

The dynamo-electric machines representing the motor and the generator may, of course, include all of the improvements and refinements disclosed in our pending applications. As, for instance, the pole pieces may be provided with pole tips with the leading end cut off, or may be provided with holes drilled therethrough to reduce the no-load flux without materially reducing the full-load flux and thus improve the regulation at the lower loads. These refinements, however, in and of themselves, are no part of the present invention and, therefore, need not be disclosed in detail in the present application.

To improve the speed regulation, particularly at light loads, and also at low speeds and light loads and heavy loads our theoretical considerations showed us that this could be accomplished if machines could be had that show no or zero hysteresis losses and yet were able to build up flux to produce voltage and torque on the generator and motor, respectively. Theoretical consideration also showed that better speed regulation at high loads and low speeds could be obtained if the current sheet were prevented from shifting because of armature reaction. Dynamo-electric machines having no hysteresis losses are neither possible nor desirable because such machines would not build up flux.

By the term current sheet is meant the effective region on the surface of the brushes of a machine at which it may be considered that the entire current flow is concentrated.

In Fig. 4b curves 3 and 3' show a speed load curve of a conventional series motor having normal residual, that is a residual magnetism of about 20% of the no load saturation magnetism which is considered normal, and which is rarely less than fifteen percent of the no load saturation value whereas curves 4 and 4' show the saturation curve of a series generator of exactly the same design and rating as the motor and also having normal residual. The speed regulation curve 5 is thus a straight line, disregarding IR losses and some other losses.

If the generator as shown by curve 21 in Fig. 4c, is provided with low residual that is, preferably no more than 10% of the no load saturation value, by increasing its normal air-gap, then the speed regulation curve is as indicated by curves 20, 20'.

This can be verified by multiplying the percent voltage, taken from curve 21 at a given percent load, by the percent speed, taken from curves 3 and 3' for the same given percent load.

If both machines, which are otherwise exactly alike in design, are each provided with low residual, as shown by curves 25 and 26 in Fig. 4d, then the speed regulation, as shown by curve 30, will also be constant.

Fig. 4f shows the curves for voltage, as curves 50 and 50', and speed regulation curves 51 and 51' for a conventional series motor and series generator operating at, say 25% full field on the generator. It will be noted that the regulation is poor at the low loads and also again at high loads.

Of course, one of the aims of our invention is to improve the regulation at low speed and low load and low speed and high load. The voltage curve of a generator of low residual for say 25% field on the generator will be as indicated by curve 40 of Fig. 4e. By calculating for the speed regulation in relation to the curve of a conventional high residual motor, the curves 41 and 41' are obtained. These curves 41 and 41' seem to show the very best speed regulation that can be obtained.

In Fig. 4g the calculated curves are shown for two like machines of low residual. The voltage curve is indicated by 60. By multiplying the percent voltage on this curve 60, for a selected percent load current, by the percent speed on curve 25 for the same selected percent load current, the motor speed may be obtained. In this manner the speed regulation curve 61 is obtained. By comparing this calculated curve 61 with the calculated curves 51 and 51', it will be noted that much better regulation is obtained at low loads. This is borne out by the curves showing actual test curves for like machines of low residual.

A still further improvement is obtained if the two machines are not exactly alike in regard to residual. To get the best regulation, the residual must be low on both machines. But in addition, the residual must be still lower on the motor than on the generator to thus prevent instability at the light loads due to the motor residual causing a higher counterelectromotive force on the motor than the voltage of the generator, thereby causing periodic (sometimes aperiodic) speed oscillations of the motor. The generator residual, though made low, must be made high enough to insure that the generator voltage builds up.

To get low residual on the machines, the poles may be annealed, as must usually be done for the two-pole construction shown in Fig. 2, or four-pole constructions may be used to thus decrease the amount of iron in the frame portion of the magnetic circuit to such an extent that low residual is obtained.

It has been found that by these procedures values of low residual magnetism are obtained which give satisfactory results, ranging from two to four percent and up to nearly twenty percent of the no load saturated value; twenty percent is considered as being substantially normal. Preferably, however, the value of the low residual is not greater than fifteen percent of the no load saturation flux.

To get the difference in the low residual of the two machines, where low residual has already been obtained, several procedures may be followed.

The air-gap of the generator may be decreased below normal and the motor air-gap left normal. This may be done by using shims on the generator pole pieces or using longer poles or a larger rotor or combinations of these procedures.

The air-gap of the generator may be left normal and the air-gap of the motor chosen to be greater than normal. This may of course be done by choosing a motor rotor less in diameter than normal or motor pole-pieces that are shorter than normal, or a combination of these procedures.

The preferred and cheaper method is, of course, the use of two machines of low residual having slightly shorter pole pieces than normal to thus obtain air-gaps slightly longer than normal. Enough magnetic shims are then placed under the pole pieces of the generator at points $a$, $b$, $c$ and $d$ (see Fig. 1) to make the air-gaps somewhat less than normal, and enough shims are then placed under the pole-pieces of the motor at points $w$, $x$, $y$ and $z$ to leave the air-gap still somewhat greater than normal. Of course, the number of shims used may be so chosen that the air-gaps for both machines range from below normal to above normal with the generator always having the lesser air-gap.

Since the generator is a machine having a low residual, the burden of maintaining its voltage at low motor speeds and heavy loads falls more and more on the generator series field windings. Since the voltage is necessarily low at the low speeds, the armature reaction distorts or shifts the current sheet so much that the generator can not maintain its voltage. The result is poor regulation and low motor torque at high loads and low speeds. We provide an additional improvement by using interpoles for the generator having a high magnetic capacity. At low speeds and heavy loads, the interpoles do not saturate and the current sheet thus remains fixed. Note the generator interpoles in relation to the motor interpoles.

Some actual speed regulation curves from tests are shown in Fig. 4a for three different speed settings. The curves 8—8′, 9—9′ and 10—10′ show the regulation for three speed settings for machines having a low residual and the novel interpoles and curves 11—11′, 12—12′ and 13—13′ show the regulation of conventional series machines connected in a series system.

The generator G has the series field 14 provided with the shunting rheostat 15. By shifting the lead 16 various motor speeds may be selected.

The other curves on Fig. 4 merely indicate voltage curves for various settings and the shaded portion 23 indicates how much less hysteresis effect there is in a machine having low residual.

Without the special interpoles for the generator, the speed regulation is poor at the right or heavy load end of the curves. For instance, for the low speed setting and no low residual for the machines and no special interpoles for the generator the regulation curve is evidenced by curve 11—11′. With low residual and no special generator interpoles, the regulation curve is evidenced by curve 8—11′. But with the complete combination as shown in Fig. 1 the speed regulation is evidenced by curve 8—8′. It is thus apparent that the speed regulation is improved over a greater load range. The shaded areas between 10 and 13, and 10′ and 13′, between 9 and 12, and 9′ and 12′ and between 8 and 11, and 8′ and 11′ show the improvements obtained. In addition, the difference in the low residual between generator and motor make the operation more stable at the left ends of the curves 8, 9 and 10.

Often the motor of a series drive as we show has to be controlled from a remote point, however, when the rheostat is mounted at a remote point the leads to the rheostat, as leads 70 and 71 in Fig. 1, represent portions of the rheostat that can not be shunted. No effective speed control is thus possible at the low end of the speed range.

By connecting the rheostat and field as shown in Fig. 2, where lead 72 in a sense compensates for lead 73, and lead 74 also in a sense compensates for lead 75, and where the leads 72 and 74 are now part of the field circuit. All of the rheostats may now be shunted and the speed control may thus be effectively carried out at the low end of the speed range. The lowest speeds possible with a given design may thus be readily obtained.

We are aware that others particularly after having had the benefit of our teachings may devise still further circuits and other similar arrangements to obtain the novel results. We, therefore, do not wish to be limited to the specific showing made but wish to be limited only by the scope of the claims hereto appended.

We claim as our invention:

1. In a motor drive circuit, in combination, a series generator, having a series field winding, a commutating field winding, and an armature winding, coupled to motor means to be driven at substantially constant speeds; a series motor connected to the generator to be electrically driven thereby; said series motor and series generator each having magnetic circuits so constructed that each dynamo-electric machine has a value of residual magnetism of less than ten percent of its no-load saturation magnetism; and said magnetic circuit of the motor being so constructed in relation to the magnetic circuit of the generator that the residual magnetism of the motor is lower than the residual magnetism of the generator; an adjustable resistor for shunting the generator series field winding to vary the voltage of the generator to thus vary the speed of the motor, said commutating field winding of the generator having a magnetic circuit of a magnetic capacity sufficiently high so that the armature reaction does not appreciably shift the current sheet at low speeds and heavy loads.

2. In a motor drive circuit, in combination, a series generator, having a series field winding, a commutating field winding, and an armature winding, coupled to motor means to be driven at substantially constant speeds; a series motor connected in a loop circuit to the generator to be electrically driven thereby; said series motor and series generator each having magnetic circuits so constructed that each dynamo-electric machine has a value of residual magnetism of no more than ten percent of its no-load saturation flux; and said magnetic circuit of the motor being so constructed in relation to the magnetic circuit of the generator that the residual magnetism of the motor is lower than the residual magnetism of the generator; an adjustable resistor to vary the motor speed, a lead, one terminal of said resistor being connected at substantially the midpoint of said lead and the ends of the lead being connected respectively to one terminal of the generator armature winding and one terminal of the generator series field winding, a second lead, the other terminal of the adjustable resistor being connected at substantially the midpoint of said second lead and the ends of the lead being connected respectively to the other terminal of the generator series field winding and to a junction, at the generator, of the said loop circuit including the series generator and the series motor; said commutating field winding of the generator having a magnetic circuit of a capacity sufficiently high so that the armature reaction does not appreciably shift the current sheet at low speeds and heavy loads.

3. In a motor drive circuit, in combination, a series generator, having a series field winding, a commutating field winding, and an armature winding, coupled to motor means to be driven at substantially constant speeds; a series motor connected in a loop circuit to the generator to be electrically driven thereby; said series motor and series generator each having magnetic circuits so constructed that each dynamo-electric machine has a value of residual magnetism of from two percent to four percent of its no-load saturation magnetism; and said magnetic circuit of the motor being so constructed in relation to the magnetic circuit of the generator that the residual magnetism of the motor is lower than the residual magnetism of the generator; an adjustable resistor to vary the motor speed, said resistor being disposed at a point remote from the generator series field winding, a pair of parallelly disposed leads having one pair of adjacent ends connected together and to one end of the resistor and having the other pair of adjacent ends connected, respectively, to one terminal of the generator armature winding and one terminal of the generator series field winding, a second pair of parallelly disposed leads having one pair of adjacent ends connected together and to the other end of said resistor and having the other pair of adjacent ends connected, respectively, to the other terminal of the generator series field winding and to a junction in the said loop circuit, whereby the two leads namely, one lead of each of the two pairs of leads, are made part of the field circuit, whereby lower motor speeds can be obtained than without this dual substantially parallel arrangement of leads of the series field and adjustable resistor, said commutating field winding of the generator having a magnetic circuit of a capacity sufficiently high so that the armature reaction does not appreciably shift the current sheet at low speeds and heavy loads.

4. In a series drive, in combination, a series generator having an armature winding, a series field winding, said generator having a magnetic circuit for the series field windings designed to have a value of residual magnetism of about four percent of the no-load saturation flux of the generator, a series motor, of the same general design and capacity as the generator but having a magnetic circuit whose normal residual magnetism is a lower value than the residual magnetism of the generator, connected in a loop circuit to the series generator to be electrically driven thereby; an adjustable resistor for shunting the generator series field winding to vary the generator voltage to thus vary the motor speed; and means for driving the generator at substantially constant speed.

5. In a series drive, in combination, a series generator having an armature winding, a series field winding, a commutating field winding having a circuit of a magnetic capacity sufficiently high so as not to become saturated by high armature currents thereby preventing a shifting of the current sheet by the armature current, said generator having a magnetic circuit for the series field windings designed to have a value of residual magnetism of from two percent to four percent of the no-load saturation magnetism of the generator; a series motor, of the same general design and capacity as the generator but having a magnetic circuit whose normal residual magnetism is a lower value than the residual magnetism of the generator, connected in a loop circuit to the series generator to be electrically driven thereby; an adjustable resistor for shunting the generator series field winding to vary the generator voltage to thus vary the motor speed; and means for driving the generator at substantially constant speed.

6. In a series drive, in combination, a series generator having an armature winding, a series field winding, said generator having a magnetic circuit for the series field windings, designed to have a value of residual magnetism of substantially four percent of the no-load saturation magnetism of the generator; a series motor, of the same general design and capacity as the generator but having a magnetic circuit whose normal residual magnetism is a lower value than the residual magnetism of the generator, connected in a loop circuit to the series generator to be electrically driven thereby; an adjustable resistor to vary the motor speed, a lead, one terminal of said resistor being connected at substantially the mid-point of said lead and the ends of the lead being connected respectively to one terminal of the generator armature winding and one terminal of the generator series field winding, a second lead, the other terminal of the adjustable resistor being connected at substantially the mid-point of said second lead and the ends of the lead being connected respectively to the other terminal of the generator series field winding and at a junction adjacent the generator of the said loop circuit including the series generator and the series motor; and means for driving the generator at substantially constant speed.

7. In a series drive, in combination, a series generator having an armature winding, a series field winding, a commutating field winding having a magnetic circuit of a capacity sufficiently high so as not to become saturated by high armature currents thereby preventing a shifting of the current sheet by the armature current, said generator having a magnetic circuit for the series field windings designed to have a value of residual magnetism that falls within the range of four percent to fifteen percent of the no-load saturation flux of the generator; a series motor, of the same general design and capacity as the generator but having a magnetic circuit whose normal residual magnetism is a lower value than the residual magnetism of the generator, connected in a loop circuit to the series generator to be electrically driven thereby; an adjustable resistor to vary the motor speed, a lead, one terminal of said resistor being connected at substantially the midpoint of said lead and the ends of the lead being connected respectively to one terminal of the generator armature winding and one terminal of the generator series field winding, a second lead, the other terminal of the adjustable resistor being connected at substantially the midpoint of said second lead and the ends of the lead being connected respectively to the other terminals of the generator series field winding and at a junction adjacent the generator, of the said loop circuit including the series generator and the series motor; and means for driving the generator at substantially constant speeed.

8. In a series drive, in combination, a series generator having a series field winding, said generator having a magnetic circuit for the series field windings including an air-gap of a given value and being designed to have a value of residual magnetism anywhere from four percent to fifteen percent of the no-lead saturation flux of the generator; a series motor, of the same general design capacity, and magnetic characteristics but having an air-gap of a greater value than the generator whereby the residual magnetism of the motor is relatively lower than the residual magnetism of the generator, connected in a loop circuit to the series generator to be electrically driven thereby; an adjustable resistor for shunting the generator series field winding to vary the generator voltage to thus vary the motor speed; and means for driving the generator at substantially constant speed.

9. In a series drive, in combination, a series generator having a series field winding, a commutating field winding having a magnetic circuit of a capacity sufficiently high so as not to become saturated thereby preventing a shifting of the current sheet, said generator having a magnetic circuit for the series field windings including an air-gap of a given value and being designed to have a value of residual magnetism of no more than fifteen percent of the no-load saturation flux of the generator; a series motor, of the same general design capacity, and magnetic characteristics but having an air-gap of a greater value than the generator whereby the residual magnetism of the motor is relatively lower than the residual magnetism of the generator, connected in a loop circuit to the series generator to be electrically driven thereby; an adjustable resistor for shunting the generator series field winding to vary the generator voltage to thus vary the motor speed; and means for driving the generator at substantially constant speed.

10. In a series drive, in combination, a series generator having a series field winding, said generator having a magnetic circuit for the series field windings including an air-gap of a given value and being designed to have a value of residual magnetism somewhat less than fifteen percent of the no-load saturation flux of the generator; a series motor, of the same general design capacity, and magnetic characteristics but having an air-gap of a greater value than the generator whereby the residual magnetism of the motor is relatively lower than the residual magnetism of the generator, connected in a loop circuit to the series generator to be electrically driven thereby; an adjustable resistor to vary the motor speed, a lead, one terminal of said resistor being connected at substantially the mid-point of said lead and the ends of the lead being connected respectively to one terminal of the generator armature winding and one terminal of the generator series field winding, a second lead, the other terminal of the adjustable resistor being connected at substantially the mid-point of said second lead and the ends of the lead being connected respectively to the other terminal of the generator series field winding and at a junction adjacent the generator of the said loop circuit including the series generator and the series motor; and means for driving the generator at substantially constant speed.

11. In a series drive, in combination, a series generator having a series field winding, a commutating field winding having a magnetic circuit of a capacity sufficiently high so as not to become saturated thereby preventing a shifting of the current sheet, said generator having a magnetic circuit for the series field windings including an air-gap of a given value and being designed to have a value of residual magnetism lower than fifteen percent with reference to the no-load saturation of the generator; a series motor, of the same general design capacity, and magnetic characteristics but having an air-gap of a greater value than the generator whereby the residual magnetism of the motor is relatively lower than the residual magnetism of the generator, connected in a loop circuit to the series generator to be electrically driven thereby; an adjustable resistor to vary the motor speed, a lead, one terminal of said resistor being connected at substantially the mid-point of said lead and the ends of the lead being connected respectively to one terminal of the generator armature winding and one terminal of the generator series field winding, a second lead, the other terminal of the adjustable resistor being connected at substantially the mid-point of said second lead and the ends of the lead being connected respectively to the other terminal of the generator series field winding and at a junction adjacent the generator of the loop circuit including the series generator and the series motor; and means for driving the generator at substantially constant speed.

WILLIAM R. HARDING.
SCOTT H. HANVILLE, Jr.